United States Patent Office 3,597,303
Patented Aug. 3, 1971

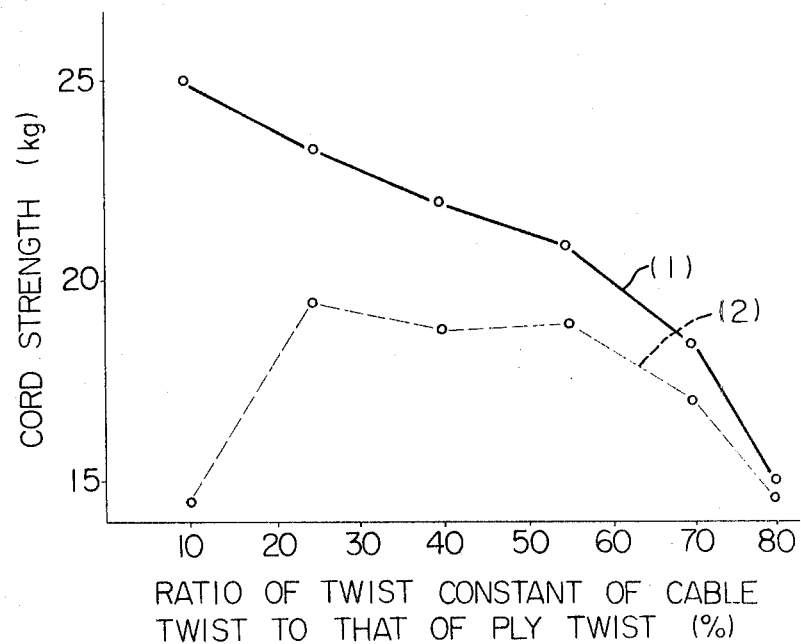

3,597,303
RADIAL-PLY PNEUMATIC TIRE COVER
Hiroshi Tanaka, Nishinomiya, Japan, assignor to Kuraray Co., Ltd., Kurashiki, Japan
Filed July 22, 1968, Ser. No. 746,432
Claims priority, application Japan, July 28, 1967, 42/48,516
Int. Cl. B29h 9/04, 17/28; B60c 9/04, 11/00
U.S. Cl. 161—144                                     4 Claims

ABSTRACT OF THE DISCLOSURE

Improved radial-ply pneumatic tire cover having the breaker, characterized: (i) that the said cords are made of yarns from polyvinyl alcohol containing not more than 2 mol percent of 1,2-glycol linkage and of a degree of polymerization of not less than 1,200, the cords being formed by twisting the said yarns which have a tenacity of at least 8 g./d., an elongation of 4–10%, and an initial modulus of at least 150 g./d., and (ii) the said twisting being performed to such a degree that the twist constant of the ply twist ranges 300–1,200, and that of the cable twist is 25–70% of the twist constant of the ply twist.

---

This invention relates to radial-ply pneumatic tire cover which possesses concurrently improved properties such as high speed quality, wear resistance, low fuel consumption, cornering characteristics, road-holding characteristics, qualitative re-productibility, etc.

More particularly, the invention relates to radial-ply pneumatic tire cover in which the cords are disposed between carcass and tread band, substantially in parallel with the equatiorial direction of the tire, and furthermore are embedded in the rubber, the characteristic features residing in:

(i) that the said cords are made of yarns from polyvinyl alcohol containing not more than 2.0 mol percent of 1,2-glycol linkage and of a degree of polymerization of not less than 1,200, the cords being formed by twisting the said yarns which have a tenacity of at least 8 g./d., an elongation of 4–10%, and an initial modulus of at least 150 g./d., and (ii) the said twisting being performed to such a degree that the twist constant of the ply twist ranges 300–1,200, and that of the cable twist is 25–70% of the twist constant of the ply twist.

Pneumatic tire covers can be classified generally into the following two groups: the one group includes those in which the tire cords are arranged in bias to the forwarding direction of the tire, that is, equatorial direction of the tire, in both carcass and breaker portions, and furthermore are embedded in rubber, which are generally called as "bias tire": and the other group which is known as "radial-ply tire" in which the cords are disposed substantially at right angle with the equatorial direction of the tire at the carcass portion, but are substantially in parallel with the equatorial direction of the tire at the breaker portion.

The mentioned radial-ply tire is known to include two different types, the first being Michelin-type radical-ply tire in which the cord arrangement is designed to form triangules in the breaker portion (U. S. Pat. 2,493,614 and British Pat. No. 628,060), and the second being Pirelli-type radial-ply tire (French Pat. No. 1,131,448, Japanese Official Patent Gazette, Publication No. 10901/1960).

The subject invention concerns with improvements in radial-ply pneumatic tire cover which belongs particularly to the latter Pirelli-type radial-ply tire in which the tire cords between carcass and tread band, viz, breaker portion, are disposed substantially in parallel with the equatorial direction of the tire and furthermore are embedded in rubber.

Generally radial-ply pneumatic tire exhibits better high speed quality compared with bias tires. This enables longer continuous use of radial-ply pneumatic tires at higher speed. This type of tire also exhibits better stability during high speed driving, having excellent cornering and road-holding characteristics. Furthermore, its tread portion is much more strongly reinforced compared with the bias tire, which causes less wear of rubber in the tread portion and extension of substantial tire life by 50%, in certain cases 100% or even higher. The fuel consumption in case of using radial-ply tires is again less, compared with the cases of using bias tire.

As the cord material for the breaker portion of the radial-ply pneumatic tire, use of flexible and substantially non-extensible fibrous material is required to meet the fundamental conditions for accomplishing the foregoing improvements. Accordingly, steel wire or high tenacity rayon filaments have been used in practice.

However, radial-ply tires with such steel wire or high tenacity rayon filament cords are still subject to numbers of practical shortcomings. For example, cars with radial-ply pneumatic tires of steel wire cords give uncomfortable ride, make large noises, and the steel wires exhibit poor workability during the tire making.

Again, when high tenacity rayon fiilament cords are used, the tire performance varies depending on the water content of the cords. Thus unless the cords are put under rigorous and difficult control for preventing their moisture absorption during the tire making, the high speed quality of the tire is reduced. This means the loss of the most advantageous characteristics of radial-ply tire, which is fatal to the commercial value of the produce. Furthermore, the performance variation also means poor quality reproducibility.

Still further, in this case it is necessary to use a thick breaker because of inferior modulus and strength as compared with steel wires, and there is a disadvantage of insufficient resistance to shock load given to the tire.

We noticed the foregoing merits of radial-extensive research works with the view to provide improved radial-ply, pneumatic tire cover in which the above-mentioned problems inherent in conventional radial-ply tires are advantageously solved and the foregoing advantageous properties are retained or even improved. As the result we discovered that in order to achieve the above purpose, specific material must be selected for the yarns forming the cords in the breaker portion which is positioned between the carcass and tread band portions of the tire cover, and the yarns must have physical properties meeting numbers of limitative conditions. Furthermore we discovered that the twist constant of the yarns is subject to certain limitations which are inseparably and closely correlated with the said property requisities.

Those combined requirements for the yarn material, physical properties thereof, and the twisting conditions for cord formation are found to be markedly critical. We discovered that unless all of the combined requirements are met, one or plural improved properties of the product tire are appreciably deteriorated.

We now discovered that as such yarn material, polyvinyl alcohol yarns are well suited to achieve the above object, while use of polyvinyl alcohol yarns as cords for radial-ply, pneumatic tire has never been practiced or even proposed in the past. Furthermore, the polyvinyl alcohol as well as the polyvinyl alcohol yarns must meet a considerable number of limitations as set forth as part (i) in an earlier paragraph of this specification, and the cords obtained by twisting the yarns must satisfy the requirements on twist constant as set forth in part (ii) of the same paragraph. To wit, the conditions consist of ply twist of the constant as low as approximately ½–¼ of that conventionally applied to tire cords, and cable twist of far less twist constant than that of conventional tire cord, such as 25–70% of the above low ply twist constant.

The conventional yarns prepared from polyvinyl alcohol have been used only for tire cords of light-load tire, such as tires of bicycles, because polyvinyl alcohol yarns have not sufficient resistance to fatigue and heat under high speed and heavy load conditions. Therefore, considering the fact that the tire cords are exposed to high speed and repetitive stress under considerably severe load conditions during the time vehicles are driven, and that the exertion of stress is accompanied with generation of heat, it is indeed an unexpected, surprising result that the various improvements are achieved by utilization of polyvinyl alcohol yarns as the cords for radial-ply, pneumatic tire cover which is recommended for high speed driving. This unpredictability is all the more true, since such utility of polyvinyl alcohol yarns has never been proposed or practiced.

Accordingly, the object of the present invention is to provide improved radial-ply pneumatic tire cover which exhibits, concurrently, excellent high speed quality, wear resistance, low fuel consumption, cornering characteristics, road-holding characteristics, impact resistance, and quality reproducibility. Furthermore the tire can be formed with excellent workability, and the tire is improved also in respect of noises and comfortable ride.

Still other objects and advantages of the invention will become clear from reading the following descriptions.

The above objects of the invention are accomplished by the use of below-specified cords in breaker portion of Pirelli-type radial-ply, pneumatic tire cover:

(i) the cords which are obtained by twisting yarns from polyvinyl alcohol containing not over 2.0 mol percent of 1,2-glycol linkage and of a degree of polymerization of not less than 1,200, preferably not less than 1,500, the said yarns having a tenacity of at least 8 g./d., preferably at least 9 g./d., an elongation of 4 to 10%, preferably 6 to 8%, and an initial modulus of at least 150 g./d., preferably at least 180 g./d., and (ii) the twisting of the yarns being performed with a twist constant of the ply twist ranging from 300–1,200, and that of the upper twist being 25–70%, preferably 25–55% of the twist constant of ply twist.

In the specification and claims, the term "1,2-glycol linkage" is used to denote the hetero-linkage in polyvinyl alcohol (PVA), that is, the linkage shown by the structural formula below:

$$-CH_2-CH-CH-CH_2$$
$$\phantom{-CH_2-}| \phantom{CH-C}|$$
$$\phantom{-CH_2-}OH \phantom{CH}OH$$

and its content is determined as follows.

1,2-glycol linkage content: An acetic acid-acidified aqueous solution of periodic acid, of which concentration is 1/100 mol/l., is added to 10 ml. of an aqueous solution containing 10 g./l. of PVA, and the system is subjected to a decomposition reaction at 25° C. for 30 minutes. Then potassium iodide is added to the reaction liquid to be reacted with the unconsumed, excessive periodic acid. Thus formed iodine is titrated with sodium thiosulfate, and the 1,2-glycol linkage content of PVA is calculated from the consumption of the titration agent, the result being expressed by mol percent.

In the specification and claims, the degrees of polymerization of PVA are the average values, and are calculated in the following manner.

Polyvinyl alcohol solution having a concentration of about 1 g./100 ml. is prepared and the exact value C of its concentration was measured. The relative viscosity $\eta_{rel}$ of the solution is measured at a temperature of 30±1° C. by means of Ostwald Capillary tube type viscosimeter.

The average polymerization degree PA is calculated in accordance with the following formulae.

$$\log PA = 1.613 \log \frac{[\eta] \times 10^4}{8.29}$$

$$[\eta] = \frac{2.303 \log \eta_{rel}}{C}$$

In accordance with the present specification and claims, tenacity, elongation, and initial modulus of PVA yarn are measured under the Oven Dry conditions in accordance with ASTM D–885 "Tire Cords From Man Made Fibers."

Also the term "twist constant" used in the specification and claims means the numerical value K obtained by equation, $$K = 1000 \times \frac{T}{\sqrt{D}}$$

when D is the total denier of yarn before the twisting and T is the number of twists (turns/10 cm.).

The PVA used in this invention is a polymer composed of the recurring unit of $$-CH_2-CH-$$
$$\phantom{-CH_2-}|$$
$$\phantom{-CH_2-}O$$

It is desirable that the residual acetic acid radical content of the PVA yarn is not over 0.5 mol percent, particularly not over 0.3 mol percent.

The methods for preparation and spinning of polyvinyl alcohol to be employed in this invention are themselves well known. Explanations on the methods are omitted to avoid diffuseness. In short, in the present invention PVA yarns of a 1,2-glycol linkage content of not over 2.0 mol percent, and a degree of polymerization of not less than 1,200 are used.

The 1,2-glycol linkage content can be controlled to the desired value, for example, by regulating the polymerization conditions of vinyl ester monomers for PVA preparation, such as vinyl acetate, vinyl formate and vinyl trifluoroacetate, etc., particularly the polymerization temperature. Or, since the linkage can be readily opened by periodic acid treatment as already described in the item on measurement of 1,2-glycol linkage content, the aqueous PVA solution before spinning may be treated with periodic acid or salts thereof in homogenous or heterogeneous system, to open the 1,2-glycol linkage to control its content to the above-specified range. In that case, initially a high degree of polymerization may be selected so that the average degree of polymerization of PVA will become not less than 1,200 after the linkage opening. Thus the linkage content may be adjusted after polymerization of PVA.

The above-listed requirements (i) for the polyvinyl alcohol yarns are closely correlated with each other and combinedly determine the performance of the tire applied with the radial-ply, pneumatic tire cover of the present invention. The conditions set forth in part (i) also are directly related to the twisting conditions (ii). Thus it is considerably difficult to explain away the significance of those limitations independently for each item. However, in the purpose of assisting easier understanding, the most significant factors only will be explained, while referring to the interdependence of mutually influencing factors.

The degree of polymerization of PVA is directly related to the inseparable, correlative conditions on tenacity and elongation required to the PVA yarns. Also the correlative conditions have a significant bearing on the occurrence of agglutination during vulcanization of the tire under elevated temperature and pressure. When the degree of polymerization of PVA is less than 1,200, it is substantially impossible to impart to the PVA yarns the required tenacity and elongation concurrently, no matter how the subsequent spinning and/or drawing conditions are adjusted. Then the cords exhibiting the desired toughness can no more be obtained, regardless how the twisting conditions of the yarn are varied. Furthermore the objectionable effect of agglutination during the vulcanization of the tire becomes more or less inevitable. In extreme cases, the function of the tire cords is entirely lost. For example, when the degree of polymerization of PVA is 1050, the PVA yarns are not useable because at the time of vulcanization of the tire the filaments constituting the yarns adhere to each other in a half-melted state and become brittle.

Again, when 1,2-glycol linkage content of PVA exceeds 2.0 mol percent, remarkable deterioration in cord strength is invited under normally employed vulcanization conditions of the tire, and the objects of the invention cannot be accomplished. In some cases the objects of the invention are entirely failed. The reason of this strength deterioration is not fully clear, but presumably the linkage content may directly influence the PVA degradation under the vulcanization conditions normally employed for manufacture of tire. For instance, if a vulcanization temperature in the order of 150° C. is employed, the strength of the cord is reduced by 15% or more, and the tire becomes useless for any practical purpose.

In accordance with the invention, the PVA yarns to form the tire cords are required to have a tenacity of not less than 8 g./d., preferably not less than 9 g./d. and, concurrently, to have an elongation of 4–10%, preferably 6–8%.

The high tenacity alone cannot achieve the object of this invention. Also, differently from the heretofore upheld concept that substantially non-extensible material is required for the breaker-cords for conventional Pirelli-type radial tires, the yarns are required to exhibit a low extensibility within a specified range in accordance with the subject invention. This elongation requisite is inseparable from the above tenacity requisite, which are also correlated with the twisting conditions (ii), all being critical for achieving the objects of this invention.

Substantially non-extensile yarns which may have an extremely low elongation of less than 4% exhibit markedly reduced strength efficiency, even when their tenacity is not less than 8 g./d., when twisted into a cord or cord fabric to be shaped into a tire. For example, PVA yarns having a tenacity of 9.3 g./d. and an elongation of 6.4% exhibit substantially no strength loss due to twisting, when twisted by 30 turns per 10 cm. Whereas, even in case the PVA yarns have a tenacity of 10.1 g./d., if their elongation is then than 4%, for example, 3.4%, their strength deterioration under similar twisting treatment was as much as 25%, and the twisted yarns have a tenacity of only 7.6 g./d.

Use of substantially non-extensile yarns, i.e., those having an elongation of less than 4%, is again objectionable in that such causes loss of impact strength.

On the other hand, if the elongation of PVA yarns exceeds 10%, even if the other requirements on tenacity and degree of polymerization of PVA are met and spinning and drawing conditions are adjusted to the optimum, the trough portion in the strength-elongation curve formed by the yield point assumes an unnegligible size. Consequently the gradient in the strength-elongation curve in the vicinity of breaking elongation becomes sharper, which in turn causes conspicuous decrease in strength efficiency under twisting, similarly to the case of employing yarns of loss than 4% elongation.

Furthermore, plastic elongation of PVA yarn is greater under higher breaking elongation. Therefore when the yarn elongation exceeds 8%, creep at high temperatures rapidly increases, producing the similar effects to those observed with low initial modulus of the yarn. This causes larger tire growth, which objectionably affects the tire tread wear.

A considerably high ratio of drawing must be given to the PVA yarn in order to impart thereto a tenacity of not less than 8 g./d., the specific values somewhat varying depending on spinning and drawing conditions.

The drawing must be such that as will impart to the PVA yarn of low extensibility, i.e., 4–10% elongation, a tenacity of at least 8 g./d., preferably at least 9 g./d., in order to render the same sufficiently hot water-resistance to withstand the high temperature conditions in the presence of water, to which the tire cords are normally exposed during tire making. More specifically, the yarn must be drawn by at least 7 times the original length, after its coagulation following the spinning is completed. The tenacity of at least 8 g./d. can be hardly obtained with a draw ratio of less than 7×.

Manufacture of tires comprises a step of treating the cords with an adhesive in the form of aqueous emulsion and drying the adhesive-applied cords. In that step, if the hot water-resistance of the yarns composing the cords is poor, the yarns are swollen by the water in the aqueous emulsion. Consequently the filaments agglutinate with each other to form extremely weak cords, unless very special conditions are employed for the subsequent drying, such as prolonged drying at 115° C. or below, or drying while the yarns are under a high tension, such as 1.0 g./d. and above.

Again in the vulcanization step required in the tire manufacture, the cords are thermally affected by the vulcanization temperature of normally at least 120° C. For this reason also the resistance to hot water of the yarns must be above certain level, and it is critical for the yarns to be imparted with a tenacity of at least 8 g./d., preferably at least 9 g./d., by suitable drawing and heat treatment, to exhibit the hot water-resistance of the required level. If the hot water-resistance of the yarns is insufficient, the water content of the cords before vulcanization (cord fabric) must be adjusted to be approximately 3% or below. Otherwise the shrinkage and deformation of the tire during the vulcanization is objectionably great, and in extreme cases the filaments mutually agglutinate to reduce the tire and function to nil. Such of course renders the actual manufacture of tire very inefficient, and degrades the quality of the products.

From the foregoing reasons, PVA yarns employed in this invention must have a tenacity of at least 8 g./d., preferably at least 9 g./d. While normally the hot water-resistance of yarns is determined by boiling test of shrinkage in hot water, etc., strength deterioration caused by the above aqueous emulsion treatment or vulcanization of tire cannot be directly evaluated from the ordinary hot water-resistance measured by simply shrinkage of the yarns in hot water. For example, the yarns of which softening point in water was 105° C. still showed agglutination during the vulcanization of tire, when they had a tenacity of 6 g./d. and an elongation of 5%, not satisfying the tenacity requisite. In the above, "softening point in water" was determined by gradually raising the temperature of water in which the sample yarn under a load of 1/500 g./d. was immersed, and measuring the temperature at which the shrinkage of the yarn reached 10%. In contrast, yarns of which softening point in water was 90° C. showed no sign of agglutination when both the tenacity and elongation of the yarns were within the specified ranges, i.e., 10.3 g./d. and 6.2%, respectively.

Those tenacity and elongation requirements are correlated also with the foregoing requirements on the 1,2-glycol linkage content and degree of polymerization of the starting polyvinyl alcohol. In this invention, the combined requirements on the physical properties of the starting polyvinyl alcohol and the yarns therefrom are very important.

Besides the foregoing, the yarns suited for the use in this invention must have an initial modulus of at least 150 g./d., more preferably at least 180 g./d. Because, when yarns of an initial modulus of less than 150 g./d.

are used, the tire prepared therewith shows dimensional expansion (growth) during the use due to the inside pneumatic pressure, which causes distortion of rubber in the pertinent portions and accelerates wear. Thus one of the most advantageous characteristics of radial-ply tires is impaired. Although this is more or less true with all the yarn materials, particularly with PVA yarn, its initial modulus largely depends on the rate of load application. Therefore, unless the initial modulus is sufficiently high, the modulus is objectionably decreased when the yarn is subjected to a load for a prolonged period. As the result, increase in tire growth cannot be avoided.

In accordance with the invention, the polyvinyl alcohol cords satisfying the above-explained requirements (i) must furthermore meet the twisting conditions set forth under the requirements (ii).

To wit, the cords must have a twist constant of 300–1,200 for the ply twist, and that of 25–70% of the ply twist constant, preferably 26–55%, for the cable twist. These values are far less than those conventionally employed for tire cords.

Taking an example of conventional bias tire, nylon (840 d.) or rayon (1650 d.) cords therefor are given a high twist such as a ply twist of 55 turns/10 cm., and normally the same order of high twist is applied also as the cable twist. In contrast to the conventional art, the requirements (ii) of the invention are indeed characteristic.

If the twist constant of ply twist of the cords is less than 300, no matter how the cable twisting is adjusted within the range specified in this invention, the results of plunger test of the tires prepared with the cords after vulcanization show dispersed breaking energy. Thus the quality reproducibility of the product tends to be impaired.

Again, when the twist constant of ply twist of the cords exceeds 1,200, e.g., approximately 1,600 similarly to the case of nylon for bias tire, the creep was enlarged and the creep life of the tire under a load of 1 g./d. at 125° C. was reduced to 1/2.5 that of the case wherein the twist constant is 1,000. Further, the life of the tire determined by a drum test in which repetitive impact is applied to the tire, was objectionably lowered.

Furthermore, the twist constant of the cable twist of the cords is required to be less than that of the ply twist, or, more specifically, 25–70% of the twist constant of the ply twist.

When the cable twist constant is too low, i.e., less than 25% of the ply twist constant, the cords tend to become flattened and their flexural fatigue property is deteriorated. For instance, the cord with ply and cable twist constant of, respectively, 500 and 75 (15% of the ply twist constant) had a flexural life of 3,240 times when measured in a repeated bending test under a load of 1 g./d. and bending angle of 90° C. This value is extremely low compared with the flexural life of 10,718 times of the same cord except that its cable twist constant is increased to 200 (40% of ply twist constant), measured by the identical test. The former flexural life is apparently inappropriate for the tire cord which is inevitably exposed to severe working conditions.

On the other hand, when the cable twist constant of the cords exceeds 70% of the ply twist constant, that is, as the former value approaches to the latter, the flexural life of the cord increases. However, initial strength of the cord is lowered, and the strength retention of the cord withdrawn from the tire after a fixed distance of road coverage is objectionably low. Thus, the adoption of cable twist constant above the specified upper limit is also economically disadvantageous.

The test results given in FIG. 1 well illustrate the above objectionable tendency.

The said drawing is a graph showing the strength variation of a cord of PVA 1100 d./1/2 with ply twist of 20 turns/10 cm. (ply twist constant:603), versus the change in cable twist constant of the cord, as expressed by percentile values to the ply twist constant. In the graph, the axis of ordinates stands for the cord strength (kg.), and the axis of abscissae, the percentile ratio. Also the broken line (2) denotes the results of measuring the strength of breaker cords taken from the tires each after a fixed distance of road coverage (50,000 km). The real line (1) denotes the results of similar measurement of the same cords in new identical tires.

From the graph it is seen that when the percentile ratio exceeds 70%, though the lowering of the cord strength during driving is no so remarked, the cord strength after driving is lower as compared with the cord of the percentile ratio of 25–70% because the initial strength of the cords of such low percentile ratio are not suitable for Therefore, the use of the cords of such high percentile ratio is not preferred. When the percentile ratio is reduced to below 25%, abrupt down in strength retention of the cords is observed from the same graph and accordingly the cards of such low percentile ratio are not suitable for practical use.

Also when a high twisting is given as the cable twist so that the cable twist constant exceeds the ply twist constant, the cord is kinked under relaxation and causes handling difficulties.

Tire cords are normally used as cord fabric, but the specific weaving conditions and structure of the cord fabric considerably vary depending on the manner of tire formation and also for each maker. Any known means of weaving is applicable in this invention, so far as the means is not detrimental to the advantageous characteristics of the cords made of polyvinyl alcohol yarns in accordance with the invention.

Also the tire cords are normally subjected to a dipping treatment to be imparted with sufficient adhesiveness with rubber. This dipping treatment in an adhesive however, is not necessarily performed after the cords are woven, but the cords may be directly dipped before or after the twisting.

The adhesive employed in this invention is not limited to specific types, but any known adhesive suitably used in rubber industries can be used, the most preferred being "RFL" (mixture of an alkaline initial condensate of resorcin and formalin with latex), or that used concurrently with a latex containing polyvinylpyridine.

The dipping conditions may be similar to those applied in cord treatment for conventional bias tire, or may be somewhat varied. For example, in radial-ply tire making, satisfactory result can be obtained even when the adhesive picked up by the dipping treatment penetrates into the cord to a considerable depth. Therefore, differently from bias tire making, the step of preventing such deep penetration of adhesive can be omitted. Normally the adhesive is used in the form of an aqueous emulsion in the dipping. After the treatment, the cords are dried and baked. It is also permissible to perform suitable drawing or heat treatment, if necessary, simultaneously in the last-mentioned step. The drying, baking, drawing, and heat treatment may be performed at the temperatures between 120–220° C., preferably not lower than 180° C.

During the heating given for the above treatments, the cords are normally put under a tension of at least 100 g. each, in order to prevent unnecessary relaxation. The tension is variable depending on tire specifications, etc., but in any case at least 100 g. per each cords is required.

Thus obtained cords of PVA yarns or cord fabric thereof exhibit excellent performance, only when they are used in breaker portion of a radial-ply tire which is reinforced by the arrangement of plural ply breakers, each ply being formed by disposing the cords on the exterior side of carcass, substantially in parallel with the circumferential direction of the tire. That is, if the so prepared cords are used in the carcass portion of a bias tire, separations at its shoulder portion too frequently take place. Furthermore, if use of the cords at the carcass portion of a radial-ply tire is attempted, the tire construction must be considerably varied to prevent the similar separations at the shoulder portion. Therefore, the cords are not to be utilized for tires other than radial-ply tire, or for parts other than breaker portion of a radial-ply tire. That is, the cards are suited for the use particularly in the breaker portion of radial-ply tire. Again, PVA yarns prepared by any method other than that described in this specification are markedly inferior to the PVA yarns specified in the invention when applied to the breaker portion of a radial-ply tire, as heretofore demonstrated with various data.

In practicing the present invention, any material which is conventionally utilized in bias tires, such as high tenacity viscose rayon, polyester yarns, polyamide yarns, polyvinyl alcohol yarns, etc., can be used in the carcass portion. Steel fibers, however, is not recommended because of its poor workability and uncomfortable ride.

The present invention is efficiently applicable to the recently-developed "bias-belted tire," which is comprising the carcass portion having the similar structure to that of the conventional bias tire and the breaker similar to that of the radial-ply tire provided beneath the tread band.

EXAMPLE 1

In the manufacture of 175–13 size radial-ply tires exclusively for automobiles for riding, PVA yarns of 1,200 d./200 f. ("f." standing for the number of filaments) were used in the carcass portion, and PVA yarns of 1,000 d./300 f. were used in the breaker portion. The method of preparation of the PVA yarns employed, and the properties of the starting PVA as well as those of the yarns were as shown in Table 1 below.

TABLE 1

|  | Sample A, 1,200.d./200.f. | Sample B. 1,000.d./300.f. |
|---|---|---|
| Starting PVA: |  |  |
| Degree of polymerization | 1,750 | 2,000 |
| Degree of saponification | 99.9 | 99.9 |
| 1,2-glycol linkage content (mol percent) | 1.75 | 1.65 |
| Dope: |  |  |
| PVA concentration in spinning solution (percent) | 43 | 20 |
| Additive | $MgSO_4$ | None |
| Temperature of spinning solution (° C.) | 135 | 105 |
| Spinning: |  |  |
| Spinning temperature (° C.) | 135 | 70 |
| Spinning operation | (1) | (2) |
| Number of filaments | 200 | 300 |
| Drawing: |  |  |
| Draw ratio | 11.5 | 13.2 |
| Drawing temperature (° C.) | 220 | 232 |
| Rate of drawing (m./min.) | 115 | 180 |
| Heat-treatment: |  |  |
| Heat-treating tension (g./d.) | 45/1,200 | 120/1,000 |
| Heat-treating temperature (° C.) | 240 | 245 |
| Heat-treating time (sec.) | 12 | 8.5 |
| Yarn property: |  |  |
| Degree of polymerization of PVA | 1,680 | 1,940 |
| 1,2-glycol linkage content (mol percent) | 1.71 | 1.68 |
| Strength (g./d.) | 7.8 | 9.5 |
| Elongation (percent) | 12 | 6.8 |
| Initial modulus (g./d.) | 115 | 210 |

[1] Dry system.
[2] Wet system.

Thus obtained PVA yarns were made into cords of 1,200 d./1/2, 47.5 (Z) x 47.5 (S) turns/10 cm. and woven into cord fabrics with the density of 40 ends/5 cm. (sample A) to be used for the carcass. Whereas, the yarns were made into cords of 1,000 d./1/2, 25.0 (Z) x 15 (S) turns/10 cm. and woven into cord fabrics with the density of 33 ends/5 cm. (sample B) to be used in the breaker portion. Both the samples A and B were dipped in the conventional manner in RFL mixed with a vinylpyridine latex, the adhesive pick-up of the sample A being 7.5%, and that of the sample B, 13.2×. The samples were dried and heat-treated at 160° C., respectively for 3 minutes and 3.5 minutes. The stretching during the treatment was 2.8% with sample A, and 0.5% with sample B. Subsequently topped sample A was applied on the tire-forming drum together with natural rubber, in such a manner that the direction of the cords should correspond with radial direction of the tire. The carcass ply was two-ply, which was stitched as fitted with bead wire, and thereafter the outer periphery of the tire-forming drum was extended to 66 cm. On the periphery then four sample B topped was wound. In that case, the 1,000/1/2 cords composing the sample B were plied up along the circumferential direction of the tire, successively each at the symmetrical position to the precedent, at the crossing angle of each 10°. Also tread rubber composed of 75% of butadiene-styrene rubber (SBR) and 25% of polybutadiene rubber was applied, and on the side wall portion, rubber composed of 45% of natural rubber and 55% of SBR was applied. Thus obtained unvulcanized tire was vulcanized in conventional manner, and cooled while pneumatic pressure was exerted from inside. Whereupon a tire in accordance with the invention was completed.

The performance of the tire was tested under a pneumatic pressure of 2.1 kg./cm.$^2$, with the results as given in Table 2 below.

In the same table, the test results of radial-ply tires of identical structure and size with those of the above product of this invention are given for comparison. For comparison's purpose, the PVA cords of this invention was replaced by the cords materials, such as cords of steel, nylon, polyester, glass fiber, and high-tenacity rayon in the breaker portion.

The testing methods and the evaluation of the results were as follows:

High Speed Quality A Test
(High Speed Peformance)

A tire whose air pressure is adjusted to 2.1 kg./cm.$^2$ is driven on a test drum. The speed is initially 100 km./hr., and raised stepwise at 10 km./hr. The maximum speed (km./hr.) at which the tire is broken is measured. A greater value means a better High Speed Quality.

High Speed Quality B Test
(High Speed Endurance)

A tire whose air pressure is adjusted to 2.1 kg./cm.$^2$ is driven on a test drum at a speed of 170 km./hr. and the time (hr.) required until the tire is broken is measured. A greater value means a more excellent ability of continuous driving at a high speed, i.e. a better High Speed Quality.

Wear Resistance Test

A car provided with tires with an air pressure of 2.1 kg./cm.$^2$ is driven on a test course mainly at a speed of 80–100 km./hr. After 40,000 km. running, reduction in thickness of the groove of the tire at its grounding portion is measured. The wear resistance is expressed by an average thickness worn during 10,000 km. drive. A smaller value means a better wear resistance.

Fuel Consumption Test

A car provided with tires with an air pressure of 2.1 kg./cm.$^2$ is driven on a test course at a speed of 100 km./hr. After 3,000 km. running, an amount of consumed gasoline is measured and the consumption of gasoline per one kilometer run is calculated. A smaller value means a less fuel consumption.

Cornering Characteristics Test

A cornering force (kg.) of a tire with an air pressure of 2.1 kg./cm.$^2$, which is driven at a speed of 100 km./hr. under the condition of slip angle of 15°, is measured and the cornering power (kg./deg.) is calculated by dividing the measured value by the slip angle. A greater value means a better cornering characteristic. A great cornering power results in a prompt response of the handle at the cornering and hence, an easy driving.

Road-holding Characteristics Test

A car provided with tires with an air pressure of 2.1 kg./cm.$^2$ is driven at a speed of 60 km./hr. on a positively wetted road. The distance from the braking point to the point where the car stops is measured. The road-holding value (percent) is a ratio of the measured value to that of a control rayon bias tire. A smaller value means a better road-holding characteristic.

Impact Resistance Test

A tire whose air pressure is adjusted to 2.1 kg./cm.$^2$ is driven at a speed of 120 km./hr. and under a load of 400 kg. on a test drum provided with 8 shock-bars of 35 mm. diameter. The tire (hr.) required until the tire is broken is measured. A greater value means a better impact resistance.

Noise Test

A car provided with tires with an air pressure of 2.1 kg./cm.$^2$ is driven at a speed of 180 km./hr. on a test course and the value (phon) of sound inside the car is measured by means of volume indicator. A smaller value means less noise.

Riding Comfort Test

A car provided with tires with an air pressure of 2.1 kg./cm.$^2$ is driven at a speed of 80–100 km./hr. on a highway, and the riding comfort test is carried out. After 200 km. riding, the riding comfort is evaluated by twenty riders on the basis of following:

Very good _____ 1
Good _____ 2
Bad _____ 3 the figures appearing in the table show average values of evaluation by twenty riders. A smaller value means a better riding comfort.

Quality Reproducibility Test

High speed durability A of each of five tires chosen at random is measured in accordance with the aforementioned test method to determine its quality reproducibility which is expressed by the fluctuation (percent) defined by the following equation $$\text{fluctuation} = \frac{\text{highest value} - \text{lowest value}}{\text{average value}} + 100$$

A smaller value means a better quality reproducibility.

TABLE 2

| Performance | (Product of (Example 1) PVA cord | (Control 1) High-tenacity rayon cord | (Control 2) Glass fiber cord | (Control 3) Polyester cord | (Control 4) Nylon cord | (Control 5) Steel wire cord |
|---|---|---|---|---|---|---|
| High speed quality: | | | | | | |
| A (km./hr.) | 200 | 150 | 170 | 140 | 190 | 180 |
| B (hr.) | 43 | 20 | 15 | 34 | 41 | 39 |
| Wear resistance (mm./10,000 km.) | 1.0 | 1.4 | 1.3 | 1.8 | 2.3 | 1.0 |
| Fuel consumption (l./km.) | 0.073 | 0.076 | 0.075 | 0.088 | 0.091 | 0.074 |
| Cornering characteristics (kg./deg.) | 54.0 | 52.9 | 53.6 | 44.1 | 43.2 | 55.8 |
| Road-holding characteristics (percent) | 68 | 71 | 70 | 76 | 82 | 68 |
| Impact resistance (hr.) | 108 | 96 | 61 | 88 | 82 | 75 |
| Noises (phon) | 50 | 52 | 60 | 54 | 58 | 65 |
| Riding comfort | 1.3 | 1.3 | 2.5 | 2.2 | 2.1 | 3.0 |
| Workability | (1) | (1) | (3) | (4) | (1) | (6) |
| Control in storage | (1) | (2) | (1) | (1) | (5) | (7) |
| Quality reproducibility (percent) | 10.1 | 33.8 | 23.2 | 20.8 | 10.8 | 16.5 |

1 Good.
2 Not good, water-control is necessary.
3 Not good, difficult to cut.
4 Not good, complicated bonding treatment is necessary.
5 Not so good, water-control is necessary.
6 Not good, difficult to cut and apt to injure operator's hands.
7 Not good, apt to rust.

Furthermore, the same testings were given to the tires manufactured in the manner similar to Example 1, except that one or plural requirements on the cords for breaker portion as set forth in (i) and (ii) in the beginning part of the specification were failed to be met. The results were as given in the following Table 3.

TABLE 3

| | Example 1 | Control 6 | Control 7 | Control 8 | Control 9 | Control 10 | Control 11 | Control 12 | Control 13 | Control 14 | Control 15 |
|---|---|---|---|---|---|---|---|---|---|---|---|
| Property of yarn in breaker portion: | | | | | | | | | | | |
| Degree of polymerization of PVA | 1,940 | 1,100 | 1,940 | 1,940 | 1,940 | 1,940 | 1,940 | 1,940 | 1,940 | 1,940 | 1,940 |
| 1,2-glycol linkage content (mol percent) | 1.68 | 1.74 | 2.20 | 1.68 | 1.68 | 1.68 | 1.68 | 1.68 | 1.68 | 1.68 | 1.68 |
| Strength (g./d.) | 9.5 | 8.9 | 9.2 | 6.8 | 10.3 | 8.3 | 8.1 | 9.5 | 9.5 | 9.5 | 9.5 |
| Elongation (percent) | 6.8 | 3.8 | 7.5 | 9.2 | 3.1 | 12.2 | 13.5 | 6.8 | 6.8 | 6.8 | 6.8 |
| Initial modulus (g./d.) | 210 | 208 | 197 | 170 | 256 | 155 | 135 | 210 | 210 | 210 | 210 |
| Twist constant of cord: | | | | | | | | | | | |
| Ply twist | 790 | 790 | 790 | 790 | 790 | 790 | 790 | 250 | 1,500 | 790 | 790 |
| Cable twist (percent) (based on twist constant of ply twist) | 43 | 43 | 43 | 43 | 43 | 43 | 43 | 43 | 43 | 18 | 77 |
| Reference: | | | | | | | | | | | |
| High speed quality: | | | | | | | | | | | |
| A (km./hr.) | 200 | 160 | 150 | 180 | 170 | 170 | 170 | 140 | 150 | 160 | 150 |
| B (hr.) | 43 | 21 | 23 | 36 | 34 | 37 | 37 | 23 | 37 | 20 | 38 |
| Wear resistance (mm./10,000 km.) | 1.0 | 1.1 | 1.3 | 1.2 | 1.1 | 1.9 | 2.0 | 1.2 | 1.9 | 1.3 | 1.8 |
| Fuel consumption (l./km.) | 0.073 | 0.081 | 0.084 | 0.081 | 0.080 | 0.088 | 0.086 | 0.076 | 0.087 | 0.077 | 0.085 |
| Cornering characteristics (kg./deg.) | 54.0 | 52.0 | 48.0 | 51.0 | 52.4 | 49.9 | 49.5 | 51.1 | 45.4 | 50.7 | 45.3 |
| Road-holding characteristics (percent) | 68 | 71 | 71 | 73 | 70 | 75 | 72 | 69 | 75 | 70 | 76 |
| Impact resistance (hr.) | 108 | 54 | 49 | 87 | 88 | 95 | 90 | 74 | 53 | 61 | 97 |
| Workability | Good | (1) | (1) | (2) | Good | Good | Good | Good | Good | (3) | Good |
| Quality reproducibility (percent) | 10.1 | 24.6 | 21.3 | 16.2 | 17.7 | 11.5 | 11.2 | 16.5 | 11.1 | 37.8 | 11.3 |

1 Not good, decrease in strength during vulcanization.   2 Not good, drying after dipping is difficult.   3 Not good, cord is flattened.

EXAMPLE 2

The PVA yarns of 1,000 d./300 f. employed in the breaker portion in Example 1, was made into cords of 1,000 d./1/3 composition, and twisted by ply twist of 30 turns/10 cm. (Z), and cable twist of 17 turns/10 cm. (S). The cords were woven into cord fabric, with the density of 20 ends/5 cm. The cord fabric was used on the breaker portion of a tire through the procedures similar to those in Example 1, except that its RFL pick-up in the dipping treatment was 14.1%, and stretching was 0.34%. Furthermore, as the tread rubber, 50%—50% blend of SBR and polybutadiene rubber was employed. The product tire showed a tread wear of 1.2 mm./10,000 km. in a road-driving test, which was approximately one-half of that measured with the control nylon bias tire. Thus the product of this invention exhibited an excellent wear resistance.

EXAMPLE 3

Employing the similar preparation conditions to those of the 1,000 d./300 f. yarns used prepared from PVA of a degree of polymerization of 2,350, a 1,2-glycol linkage content of 1.89 mol percent, which was obtained by polymerization of vinyl acetate at 80° C., followed by alkaline saponification. In this case, however, the draw ratio was 13.6×, drawing temperature was 246° C., drawing speed was 150 m./min., heat-setting temperature was 251° C., and heat-treating tension was 150 g./1,000 d. The resultant yarn had a tenacity of 9.3 g./d., an elongation of 5.7% and an initial moduls of 250 g./d. The yarns were used as the cords at the cords at the breaker portion of a tire in the manner similar to Example 1, and for the carcass portion the cords of 840 d./140 f., which were twisted by 47 (Z) x 47 (S) turns/10 cm., were employed. The cord fabric for the carcass portion was dried and heat-treated, after the dipping treatment, at 210° C., with a stretching of 8.0%. The tire thus prepared exhibited far superior high speed performance and endurance, compared with the tires in which glass fiber, rayon or steel cords were used as the material of the breaker portions.

EXAMPLES 4, 5, 6 AND 7

Polyvinyl alcohol of a degree of polymerization of 1750, that of saponification of 99.9%, and 1,2-glycol linkage content of 1.73 mol percent was dissolved in water at a concentration of 43%. To the aqueous solution then 0.5% of magnesium sulfate and 0.0025% of Turkey red oil were added, the percentages based on PVA. The solution was extruded through a spinneret of 0.1 mm$\phi$ at a rate of 1 cc./min. The resultant filaments were dried and wound to provide undrawn filaments of 13,700 d./200 f. (in absolutely dried state). The filaments were passed through an air-nozzle to be "interlaced." After the monofilaments were sufficiently inter-entangled, they were fed into a drawing oven through which hot air current of 248° C. was circulated, at a rate of 25 m./min., and drawn by 13.5 times. The drawn filaments were fed into a heat-treating oven of the similar structure in succession, and heat-treatment at 252° C. while being imparted with 3% of thermal shrinkage, followed by an oiling. Then they were dried and wound up at a rate of 328 m./min. Thus obtained yarns were 1,100 d./200 f. in size, having a tenacity of 10.6 g./d., an elongation of 7.2%, and an initial modulus of 270 g./d. The yarns were formed into a cords of 1,000 d./1/2. A constant twisting by 20 turns/10 cm. (Z) (corresponding to twist constant K of 603) was given as the ply twist to all the samples, and the twist constant of the cable twist was varied in each run, as 10%, 25%, 40%, 55%, 70%, and 80%, of the K of the ply twist. Following the procedures of Example 1, radial-ply tires in which both carcass and breaker portions were made of polyvinyl alcohol yarns were prepared, using the above cords. Each tire was mounted on a drum tester and driven to run at a rate of 100 km./hr. After the running of over 50,000 km., the tire was broken down, and each two cords at the center of breaker portion were withdrawn from the four breaker plies, and their strength was measured. The results of comparing the above-measured values with those of the similar cords withdrawn from the identical tires before the running test is given in Table 4 below.

TABLE 4

| Ratio of K of cable twist to K of ply twist (percent) | 10 | 25 | 40 | 55 | 70 | 80 |
|---|---|---|---|---|---|---|
| New cord strength (kg.) | 25.1 | 23.6 | 22.1 | 20.9 | 18.7 | 15.0 |
| Cord strength after 50,000 km. coverage (kg.) | 14.7 | 19.5 | 8.4 | 19.1 | 18.0 | 14.8 |
| Example number | | 4 | 5 | 6 | 7 | |

From the above results, it was confirmed that the advantageous strength retention was exhibited by the cords in which the percentile ratio of cable twist constant to the ply twist constant was within the range of 25–70%.

I claim:
1. A radial-ply pneumatic tire cover in which the cords are disposed between carcass and tread bands forming portions of said tire; said cords being disposed substantially in parallel relation with the equatorial direction of said tire and being embedded in the rubber of said tire; said cords being prepared from yarns of polyvinyl alcohol containing not more than 2 mol percent of 1,2-glycol linkages, a degree of polymerization of not less than 1200, a tenacity of at least 8 g./d., an elongation of 4–10% and an initial modulus of at least 150 g./d.; said cords being formed by doubling and twisting a plurality of plies formed by twisting at least one of said yarns, the twist constant of the ply twist being from 300–1200 and the twist constant of said cord twist being 25–70% of said twist constant of said ply twist.

2. The tire cover of claim 1, wherein the degree of polymerization of the polyvinyl alcohol is at least 1,500.

3. The tire cover of claim 1, wherein the tenacity of the yarn is at least 9 g./d., elongation is 6–8%, and the initial modulus is at least 180 g./d.

4. The tire cover of claim 1, wherein the twist constant of the cable twist is 25–55% of that of the ply twist.

References Cited

UNITED STATES PATENTS 2,586,795  2/1952  Drisch et al. _____ 152—356X
3,500,888  3/1970  Boileau _____ 152—359X WILLIAM A. POWELL, Primary Examiner U.S. Cl. X.R.

57—140, 153, 157, 164; 152—359; 156—123; 161—88, 168, 175